US012658151B2

(12) United States Patent
Kim et al.

(10) Patent No.: US 12,658,151 B2
(45) Date of Patent: Jun. 16, 2026

(54) DISPLAY APPARATUS AND CONTROL METHOD FOR SAME

(71) Applicant: Samsung Electronics Co., Ltd., Suwon-si (KR)

(72) Inventors: Hyunki Kim, Suwon-si (KR); Kwangmin Kim, Suwon-si (KR); Hyuntaek Na, Suwon-si (KR); Wunkil Lee, Suwon-si (KR); Hongchul Lee, Suwon-si (KR); Gucheol Jeong, Suwon-si (KR); Hyeonjin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 18/593,541

(22) Filed: Mar. 1, 2024

(65) Prior Publication Data

US 2024/0212637 A1 Jun. 27, 2024

Related U.S. Application Data

(63) Continuation of application No. PCT/KR2022/095133, filed on Oct. 19, 2022.

(30) Foreign Application Priority Data

Oct. 26, 2021 (KR) ........................ 10-2021-0143743

(51) Int. Cl.
*G09G 3/34* (2006.01)

(52) U.S. Cl.
CPC ... *G09G 3/3426* (2013.01); *G09G 2320/0233* (2013.01); *G09G 2320/0626* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 5,592,193 A * | 1/1997 | Chen | ...................... | G09G 3/342<br>345/88 |
| 7,232,248 B2 * | 6/2007 | Sung | ...................... | G09G 3/342<br>362/613 |

(Continued)

FOREIGN PATENT DOCUMENTS

| | | |
|---|---|---|
| JP | 2002006789 A | 1/2002 |
| JP | 2007067313 A | 3/2007 |

(Continued)

OTHER PUBLICATIONS

Korean Office Action issued Feb. 28, 2025 in corresponding Korean Patent Application No. 10-2021-0143743.

(Continued)

*Primary Examiner* — Fred Tzeng
(74) *Attorney, Agent, or Firm* — Nixon & Vanderhye, P.C.

(57) ABSTRACT

A display apparatus comprising: a first power supply unit; a second power supply unit; a first switching unit; a second switching unit; a display panel; a backlight unit for providing light to the display panel by means of the first light emitting elements and second light emitting elements; a first driver for driving the first light emitting elements using the supplied power; a second driver for driving the second light emitting elements using supplied power; and at least one processor, individually and/or collectively, configured to provide power supplied from the first power supply unit and the second power supply unit to the first driver and the second driver, or provide power supplied from only the first power supply to the first driver and the second driver, by (Continued)

controlling the first switching unit and the second switching unit based on user input for adjusting luminance of the display panel.

20 Claims, 14 Drawing Sheets

(56) References Cited

U.S. PATENT DOCUMENTS

| | | | | |
|---|---|---|---|---|
| 8,063,871 | B2 | 11/2011 | Lee et al. | |
| 8,451,209 | B2 * | 5/2013 | Sugino | G09G 3/342 725/38 |
| 8,659,237 | B2 * | 2/2014 | Archenhold | H05B 45/395 315/297 |
| 8,779,696 | B2 * | 7/2014 | Williams | H05B 47/18 345/82 |
| 8,796,957 | B2 * | 8/2014 | Shin | H05B 45/46 315/185 S |
| 9,998,732 | B2 * | 6/2018 | Yamakawa | G02B 6/00 |
| 10,460,650 | B2 * | 10/2019 | Hyeon | G09G 3/32 |
| 11,037,494 | B1 | 6/2021 | Chang et al. | |
| 11,488,519 | B2 | 11/2022 | Hyeon | |
| 11,783,788 | B2 | 10/2023 | Pang et al. | |
| 11,830,453 | B2 * | 11/2023 | Jung | G09G 3/3426 |
| 11,972,731 | B2 * | 4/2024 | Mi | G09G 3/2007 |
| 2007/0001943 | A1 * | 1/2007 | Lee | G09G 3/2014 345/83 |
| 2009/0195484 | A1 * | 8/2009 | Lee | G09G 3/3225 345/76 |
| 2011/0018787 | A1 * | 1/2011 | Nakamura | G09G 3/3291 345/76 |
| 2012/0005493 | A1 | 1/2012 | Fujita | |
| 2012/0200228 | A1 | 8/2012 | Fujita | |
| 2019/0325828 | A1 * | 10/2019 | Zhang | G09G 3/3225 |
| 2022/0180826 | A1 * | 6/2022 | Kang | G09G 3/3426 |
| 2022/0208078 | A1 * | 6/2022 | Choi | G09G 3/2025 |
| 2022/0262322 | A1 | 8/2022 | Pang et al. | |
| 2022/0276533 | A1 | 9/2022 | Lee et al. | |
| 2023/0090321 | A1 * | 3/2023 | Hsieh | G09G 5/10 |
| 2023/0419916 | A1 | 12/2023 | Pang et al. | |

FOREIGN PATENT DOCUMENTS

| | | | |
|---|---|---|---|
| JP | 2011138673 | A | 7/2011 |
| JP | 2011222321 | A | 11/2011 |
| JP | 5301679 | B2 | 6/2013 |
| JP | 2013200518 | A | 10/2013 |
| JP | 2014240854 | A | 12/2014 |
| JP | 2015201712 | A | 11/2015 |
| KR | 100855472 | B1 | 9/2008 |
| KR | 100922195 | B1 | 10/2009 |
| KR | 101046114 | B1 | 7/2011 |
| KR | 20210008246 | A | 1/2021 |
| KR | 102540011 | B1 | 6/2023 |
| WO | 2021/185150 | | 9/2021 |
| WO | 2021173153 | A1 | 9/2021 |

OTHER PUBLICATIONS

International Search Report for PCT /KR2022/095133 mailed Feb. 17, 2023, 4 pages.

Written Opinion of the ISA for PCT /KR2022/095133 mailed Feb. 17, 2023, 4 pages.

Extended European Search Report dated Oct. 11, 2024 issued in European Patent Application No. 22887771.8.

Examination Report issued Nov. 11, 2025 in European Patent Application No. 22887771.8.

Notice of Allowance issued Nov. 30, 2025 in Korean Patent Application No. 10-2021-0143743 and English-language translation.

* cited by examiner

DISPLAY APPARATUS AND CONTROL METHOD FOR SAME

CROSS-REFERENCE TO RELATED APPLICATIONS

This application is a continuation of International Application No. PCT/KR2022/095133 designating the United States, filed on Oct. 19, 2022, in the Korean Intellectual Property Receiving Office and claiming priority to Korean Patent Application No. 10-2021-0143743, filed on Oct. 26, 2021, in the Korean Intellectual Property Office, the disclosures of each of which are incorporated by reference herein in their entireties.

BACKGROUND

Field

The disclosure relates to a display apparatus and a control method for the same.

Description of Related Art

In accordance with the development of display information processing technology, the development of display technology to display information has been accelerated. Due to the development of the display technology, the demand for a related-art Cathode-Ray Tube (CRT) is drastically reduced, and demand for a flat panel display such as a liquid crystal display (LCD) is rapidly increased. In general, an LCD provides an image to a user by transmitting light generated from a light source of a rear surface to a front panel using a transmittance change of liquid crystal according to a voltage applied to the panel. In this example, since the LCD panel is not self-emissive, a display apparatus separately needs a backlight for providing a light source.

In the meantime, the development of the display technology also diversifies the size of a screen of a display apparatus. In the related-art, if only the production of a display apparatus having a limited size is possible, recently, a display apparatus of a large screen may be manufactured, overcoming the limitation of size, and the use of a display apparatus of a large screen in everyday life is increasing. For example, a display apparatus of a large screen is used as a kiosk for transmitting and receiving order information through a touch screen in most recent restaurants and stores.

In the meantime, the enlargement of the screen of the display apparatus extends the utilization space of the display apparatus from indoors to outdoors. In particular, as media technology is applied to technologies of developed display hardware, a display apparatus of a large screen is widely used as a digital signage advertisement board for displaying an outdoor advertisement through a display apparatus after being installed in a space with large floating population such as a subway station, a bus stop, and the like. Meanwhile, a display apparatus installed outdoors mostly includes a heat exchanger for stable driving without depending on an outdoor temperature change. In this example, due to a heat exchanger having a relatively large volume compared to other components, most of the display apparatuses of a large screen drives a backlight using a plurality of power supply units. However, in this example, since the power of the plurality of power supply units should be maintained in a state of being turned on for 24 hours, there is a problem in that power consumption of the display apparatus increases. That is, the display apparatus of a large screen which is stable against changes in outdoor temperature and is advantageous in power consumption is not provided.

SUMMARY

Embodiments of the disclosure provide a display apparatus and a method for controlling the display apparatus.

A display apparatus according to an example embodiment includes: a first power supply unit comprising a power supply, a second power supply unit comprising a power supply, a first switching unit comprising a switch, a second switching unit comprising a switch, a display panel, a backlight unit comprising a backlight configured to provide light to the display panel using first light emitting elements and second light emitting elements, a first driver configured to drive the first light emitting elements using the supplied power, a second driver configured to drive the second light emitting elements using supplied power, and at least one processor, comprising processing circuitry, individually and/or collectively, configured to: provide power supplied from the first power supply unit and the second power supply unit to the first driver and the second driver, or provide power supplied from only the first power supply to the first driver and the second driver, by controlling the first switching unit and the second switching unit based on an input for adjusting luminance of the display panel.

At least one processor, individually and/or collectively, is configured to: control, based on receiving an input for lowering a brightness of the display panel to a specified brightness based on the power provided from the first power supply unit and the second power supply unit being provided to the first driver and the second driver, the first switching unit and the second switching unit so that power supplied from the first power supply unit is provided to the first driver and the second driver.

At least one processor, individually and/or collectively, is configured to: control the first switching unit and the second switching unit so that only power supplied from the first power supply unit is provided to the first driver and the second driver and turn off the second power supply unit.

At least one processor, individually and/or collectively, is configured to: based on receiving an input to increase brightness of the display panel to a specified brightness based on the power supplied from the first power supply unit being provided to the first driver and the second driver, turn on the second power supply unit.

At least one processor, individually and/or collectively, is configured to: control the first switching unit and the second switching unit so that the power supplied from the first power supply unit and the second power supply unit is provided to the first driver and the second driver after turning on the second power supply unit.

The first driver includes: a first output terminal corresponding to a first type light emitting element configured to receive power from only the first power supply unit, and a second output terminal corresponding to a second type light emitting element configured to selectively receive power from the first power supply unit or the second power supply unit, the second driver comprises a third output terminal corresponding to a first type light emitting element configured to receive power from only the first power supply unit, and a fourth output terminal corresponding to a second type light emitting element configured to selectively receive power from the first power supply unit or the second power supply unit, wherein at least one processor, individually and/or collectively, is configured to: based on receiving an input for lowering the brightness of the display panel to a specified brightness based on the power supplied from first power supply unit being provided to the first type light emitting element through first output terminal of the first driver and the third output terminal of the second driver and the power supplied from the second power supply unit being provided to the second type light emitting element through the second output terminal of the first driver and the fourth output terminal of the second driver, control the first switching unit and the second switching unit such that power supplied from the first power supply unit is provided to the second type light emitting element through the second output terminal and the fourth output terminal.

At least one processor is configured to: based on receiving an input for increasing the brightness of the display panel to a specified brightness based on power supplied from the first power supply unit being provided to the second type light emitting element through the second output terminal of the first driver and the fourth output terminal of the second driver, and the power supplied from the first power supply unit being provided to the second type light emitting element through the second output terminal of the first driver and the fourth output terminal of the second driver, turn on the second power supply unit, and control the first switching unit and the second switching unit such that power supplied from the second power supply unit is provided to the second type light emitting element through the second output terminal and the fourth output terminal and turn off the second power supply unit.

A method of controlling a display apparatus according an example embodiment, wherein the display apparatus includes a first power supply unit including a power supply, a second power supply unit including a power supply, a first switching unit including a switch, a second switching unit including a switch, a display panel, a backlight unit including backlight configured to provide light to the display panel using first light emitting elements and second light emitting elements, a first driver configured to drive the first light emitting elements using the supplied power, a second driver configured to drive the second light emitting elements using supplied power, and at least one processor comprising processing circuitry, the method comprising: receiving an input for adjusting luminance of the display panel; and controlling the first switching unit and the second switching unit to provide power supplied from the first power supply unit and the second power supply unit to a first driver for driving the first light emitting elements and a second driver for driving the second light emitting elements, or to provide power supplied from the first power supply unit to the first driver and the second driver, based on the input.

The controlling includes, based on receiving an input for lowering the brightness of the display panel to a specified brightness based on the power supplied from the first power supply unit and the second power supply unit being provided to the first driver and the second driver, controlling the first switching unit and the second switching unit so that only power supplied from the first power supply unit is provided to the first driver and the second driver.

The controlling includes, based on controlling the first switching unit and the second switching unit to provide only power supplied from the first power supply unit to the first driver and the second driver, turning off the second power supply unit.

The controlling further includes, based on receiving an input to increase brightness of the display panel to specified brightness based on the power supplied from the first power supply unit being provided to the first driver and the second driver, turning on the second power supply unit.

The method further includes, based on turning on the second power supply unit, controlling the first switching unit and the second switching unit so that power supplied from the first power supply unit and the second power supply unit are provided to the first driver and the second driver.

Other specific details of the disclosure are included in the detailed description and drawings.

According to various example embodiments the disclosure, power consumption of a display apparatus including a heat exchanger may be reduced. For example, in case of an outdoor display apparatus where a region in which a driving unit in the display apparatus may be disposed is relatively narrow due to the heat exchanger, and including a plurality of power supply units, by selectively turning off the power of the power supply unit for supplying power in the display apparatus according to the luminance value, power consumption of the display apparatus may be reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The disclosure will be described in greater detail with reference to the drawings.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms may be arbitrarily chosen. In this case, the meaning of such terms will be mentioned in detail in a corresponding description portion of the disclosure. Therefore, the terms used in the disclosure should be defined based on the meaning of the terms and the contents throughout the disclosure rather than simple names of the terms.

Expressions such as "have," "may have," "include," "may include" or the like represent presence of a corresponding feature (for example, components such as numbers, functions, operations, or parts) and do not exclude the presence of additional features.

Expressions such as "at least one of A or B" and "at least one of A and B" should be understood to represent "A," "B" or "A and B."

As used herein, the terms "first," "second," or the like may identify corresponding components, regardless of importance of order, and are used to distinguish a component from another without limiting the components.

A description that one element (e.g., a first element) is "(operatively or communicatively) coupled with/to" or "connected to" another element (e.g., a second element) should be interpreted to include both the case that the one element is directly coupled to the other element, and the case that the one element is coupled to the another element through still another element (e.g., a third element).

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," "part," and so on is used to refer to an element that performs at least one function or operation, and such element may be implemented as hardware or software, or a combination of hardware and software. Further, other than when each of a plurality of "modules," "units," "parts," and the like must be realized in an individual hardware, the components may be integrated in at least one module or chip and be realized in at least one processor.

In this description, a term user may refer to a person provided with contents through a display apparatus but is not limited thereto.

Figure 1:
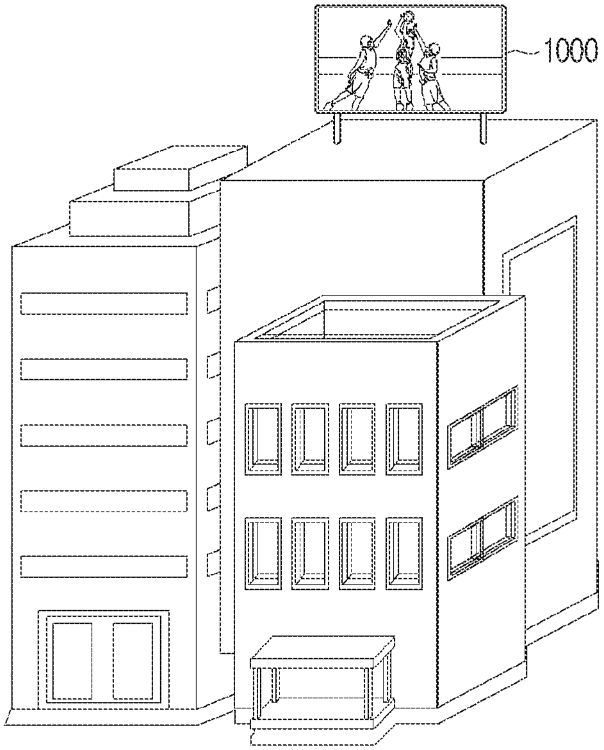
FIG. 1 is a diagram illustrating a display apparatus according to various embodiments.

FIG. 1 is a diagram illustrating an example display apparatus according to various embodiments.

According to the recent development of display hardware, a display apparatus for providing a large screen may also display high-resolution and high-luminance information. Accordingly, the use of a display apparatus of a large screen is increasing.

For example, as media technology and information communication technology are applied to technologies of developed display hardware, as shown in FIG. 1, a display apparatus 1000 is widely used as a digital signage advertisement board for displaying an outdoor advertisement through a display apparatus of a large screen after being installed in a place with heavy floating population such as a subway station, a bus stop, and the like.

Most display apparatuses installed outdoors are equipped with a heat dissipation system and a device to secure driving stability and reliability in high temperature and high light outdoor environments. For example, by maintaining the temperature of the display apparatus through a heat exchange method using a heat exchanger, the display apparatus may be stably driven even in an outdoor environment. The display apparatus adopting the heat exchange method includes a heat exchanger, and due to a heat exchanger having a relatively large volume compared to other components (for example, a switching mode power supply (SMPS), an LED driver, etc.). required for driving the display apparatus, there is a limitation of disposing components (e.g., SMPS, LED driver, etc.) necessary for driving the display apparatus.

Figure 2:
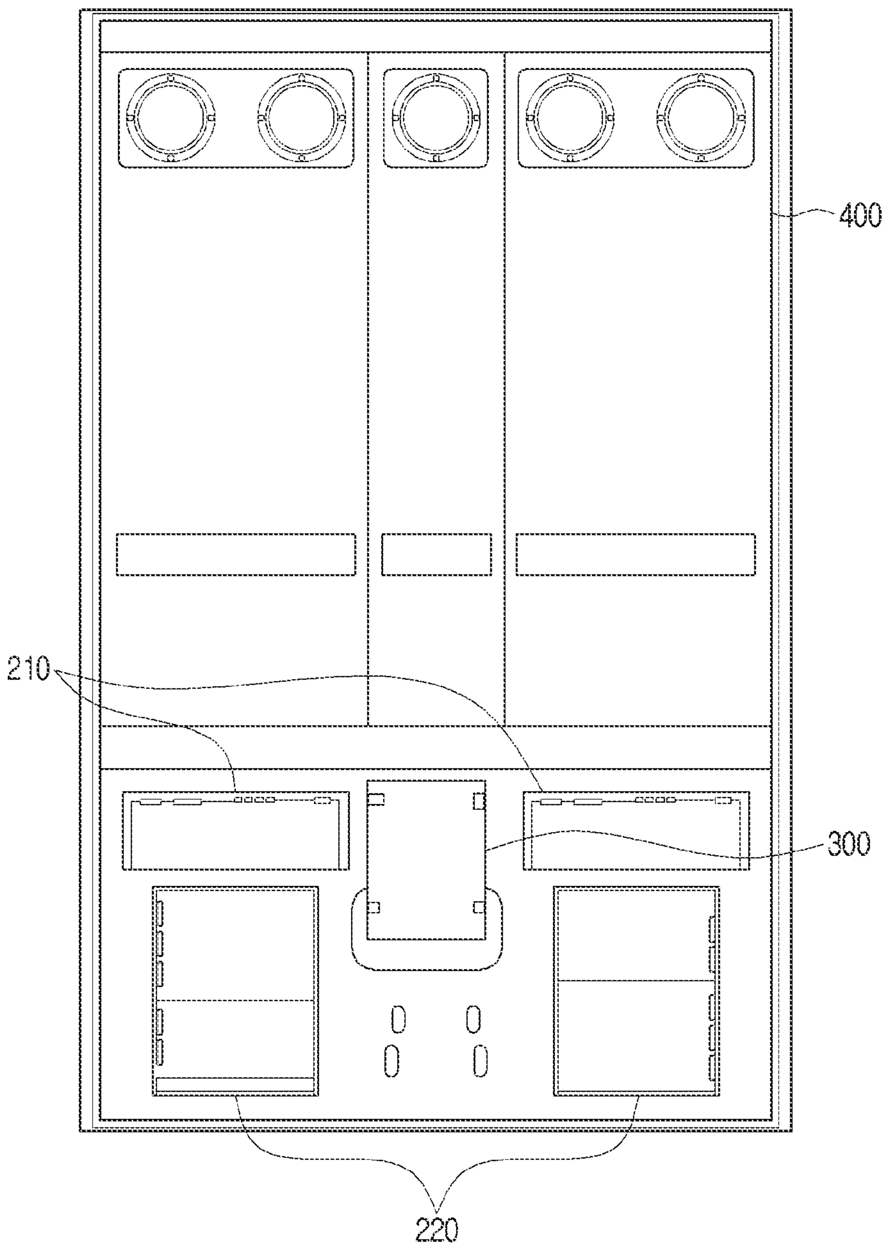
FIG. 2 is diagram illustrating an example layout \of a display apparatus of a large screen according to various embodiments.

FIG. 2 is a diagram illustrating an example layout of a display apparatus of a large screen according to various embodiments.

Referring to FIG. 2, in order to drive ae backlight unit (e.g., including a backlight including various light emitting elements) 110 of a display apparatus, a display apparatus 1000 includes a power supply unit (e.g., including a power supply) 210, a driver (e.g., including various circuitry) 220, a processor (e.g., including processing circuitry) 300, and a heat exchanger 400.

Referring to FIG. 2, a heat exchanger occupies most of the spaces of the display apparatus. Accordingly, in the arrangement of components such as a power supply unit 210, a driver 220, and a processor 300 for driving the display apparatus, there is a space constraint. For example, when one power supply unit 210 and one driver 220 are used to drive a display apparatus of a large screen, the power supply unit 210, the driver 220, and the size and volume of each of the power supply unit 210 and the driver 220 cannot help being increased, and it is practically impossible to arrange the corresponding power supply unit 210 and the driver 220 in a display apparatus in which a valid space is narrow due to the heat exchanger. Therefore, most of the display apparatus 1000 of the large screen including the heat exchanger drives the backlight unit 110 through a plurality of power supply units 211, 212 and a plurality of drivers 221, 222.

In this example, however, there may be a problem in that power consumption increases. When a display apparatus 1000 is driven according to a local dimming method, the plurality of power supply units 211 and 212 and the drivers 221 and 222 drive the light emitting elements in the divided regions of the backlight unit 110. Therefore, power of the plurality of power supply units 211, 212 should always be turned on. When the power of a specific power supply unit is turned off, a screen is not displayed in a specific region corresponding to the turned-off power supply unit among the entire display screens. Therefore, in the case of a display apparatus including a heat exchanger and driven according to a local dimming method, a plurality of power supply units should always be maintained in a turned-on state, and there is a problem in that power consumption increases.

In order to address this problem, according to an embodiment of the disclosure, a driving method using a plurality of power supply units 211, 212 (see, e.g., FIG. 4) at a low luminance value is changed to a manner of driving all light emitting elements included in the backlight unit 110 of the display apparatus 1000 by one power supply unit. Hereinafter, example embodiments of the disclosure related thereto will be described in greater detail.

Figure 3:
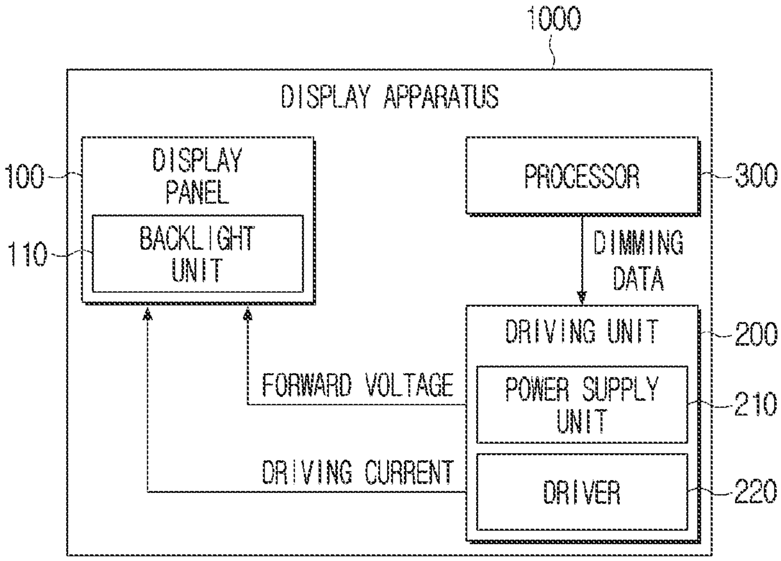
FIG. 3 is a block diagram illustrating an example configuration of a display apparatus according to various embodiments.

FIG. 3 is a block diagram illustrating an example configuration of a display apparatus according to various embodiments.

Referring to FIG. 3, the display apparatus 1000 includes the display panel 100, the driving unit (e.g., including circuitry) 200, and the processor (e.g., including processing circuitry) 300. The driving unit 200 includes a power supply unit (e.g., including a power supply) 210 and a driver (e.g., including circuitry) 220.

The display apparatus 1000 according to an embodiment of the disclosure displays video data. The display apparatus 1000 may be implemented as a TV, but is not limited thereto, and is not limited to any device having a display function, such as a video wall, a large format display (LFD), a digital signage, a digital information display (DID), a projector display, and the like.

The display panel 100 includes a plurality of pixels and displays an image signal. More specifically, the embodiment may include various types of display panels such as a liquid crystal display (LCD) panel, a passive matrix LCD (PMLCD) panel, an active matrix LCD (AMLCD) panel, etc., but is not limited thereto.

According to an embodiment of the disclosure, the display panel 100 may be implemented as a liquid crystal display panel. That is, the display panel 100 may be a display panel implemented as a liquid crystal element which is a display element using a liquid crystal capable of electrically controlling the transmittance of light.

In the meantime, the display apparatus 1000 may include the backlight unit 110 to display an image on the display panel 100 implemented by a liquid crystal element which does not emit light by itself. For example, the display apparatus 1000 may operate in such a manner that liquid crystal is injected between two glass plates, and the injected liquid crystals pass light supplied from the backlight unit 110 in a vertical orientation and a horizontal twist orientation through ON/OFF of the thin film transistor to make the light incident on the front surface of the display panel 100. The backlight unit 110 will be described in greater detail below with reference to FIG. 4.

In the meantime, the driving unit 200 includes the power supply unit 210 and a driver 220.

The power supply unit 210 may include a power supply and converts commercial power such as 110V, 220V, etc. into a voltage required inside the display apparatus, and may be implemented as a Switched Mode Power Supply (SMPS). At this time, the power supply unit 210 may provide power required for the display panel 100, the driver 220, and the processor 300. For example, the power supply unit 210 may generate, as the rectified DC power source, DC power which is balanced and rectified so that currents provided to the array of L (L is the natural number of 1 or more) light emitting elements 111 provided in the backlight unit 110, which will be described later, are the same, and then provide the same to each light emitting element 111.

In the meantime, the driver 220 may include various circuitry and provides a current for driving the light emitting element disposed in the backlight unit. Specifically, when a dimming signal based on image data is received from a processor, a supply time and an intensity of the driving current are adjusted based on the received dimming signal. In addition, the driver 220 provides the corresponding driving current to the light emitting element 111 corresponding to a dimming signal among a plurality of light emitting elements 111 arranged in the backlight unit 110. For this, though not illustrated in the drawings clearly, the driver 220 includes a constant current supply circuit for generating and supplying a driving current, and the driver 220 adjusts the driving current output from the constant current supply circuit based on the level of the selection signal supplied from the processor 300 and provides the adjusted driving current to the backlight unit 110. In the meantime, the driver 220 may receive a voltage from the above-described power supply unit 210 (for example, SMPS). However, the embodiment is not limited thereto, and a voltage may be applied from a separate power supply device. Although the power supply unit 210 and the driver 220 are illustrated as separate units in FIG. 3, the power supply unit 210 and the driver 220 may be implemented as an integrated module.

The processor 300 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 300, may, for example, control the overall operation of the display apparatus 1000. The processor 300 may control the luminance of the light emitting element 111 included in the backlight unit 110 using a pulse width modulation (PWM) having a variable duty ratio based on a dimming signal, or may control the luminance of the light emitting element 111 by varying a driving current generated by the driver 220. Here, the PWM signal controls the turn-on/off ratio of the light sources, and the duty ratio (%) is determined according to the dimming signal input from the processor 300.

For example, the processor 300 obtains a dimming ratio for driving the backlight unit 110, that is, a lighting duty of current (hereinafter, a current duty) for driving the backlight unit 110. For example, the processor 300 may obtain a current duty for driving the backlight unit 110 based on pixel information (or pixel physical quantity) of the input image. Here, the pixel information may be at least one of an average pixel value of an input image, a maximum pixel value (or a peak pixel value), a lowest pixel value, an intermediate pixel value, or an average picture level (APL). Alternatively, the pixel information may be at least one of an average pixel value, a maximum pixel value (or a peak pixel value), a lowest pixel value, and an APL value of each image block region included in the input image. In this example, the pixel value may include at least one of a luminance value (or a grayscale value) and a color coordinate value.

The processor 300 may obtain a dimming ratio, that is, a current duty, for driving the backlight unit 110 for each section based on the pixel information for each predetermined section of the input image, for example, APL information. Here, the predetermined section may be a frame unit, but is not limited thereto, and may be a plurality of frame sections, a scene section, and the like. In this example, the processor 300 may obtain the current duty based on the pixel information based on a predetermined function (or a calculation algorithm), but the current duty information according to the pixel information may be pre-stored in the form of, for example, a lookup table or a graph.

Meanwhile, the processor 300 may drive the backlight unit 110 by local dimming for identifying a screen as a plurality of regions and individually controlling backlight luminance for each region. Specifically, the processor 130 may identify a screen into a plurality of screen regions capable of separately controlling according to an implementation form of the backlight unit 110, and obtain a current duty for driving each light source of the backlight unit 110 corresponding to each image region based on pixel information of an image (hereinafter, an image region) to be displayed in each screen region, for example, APL information. For this, the backlight unit 110 may be divided into a plurality of blocks each including a predetermined number of light emitting elements. This will be described in detail with reference to FIGS. 4, 5, and 6.

In addition, the processor 300 may turn on/off power of the power supply unit 210 based on a luminance value of a user inputted through an interface (not shown) or a communicator (not shown). This will be described in detail below.

Figure 4:
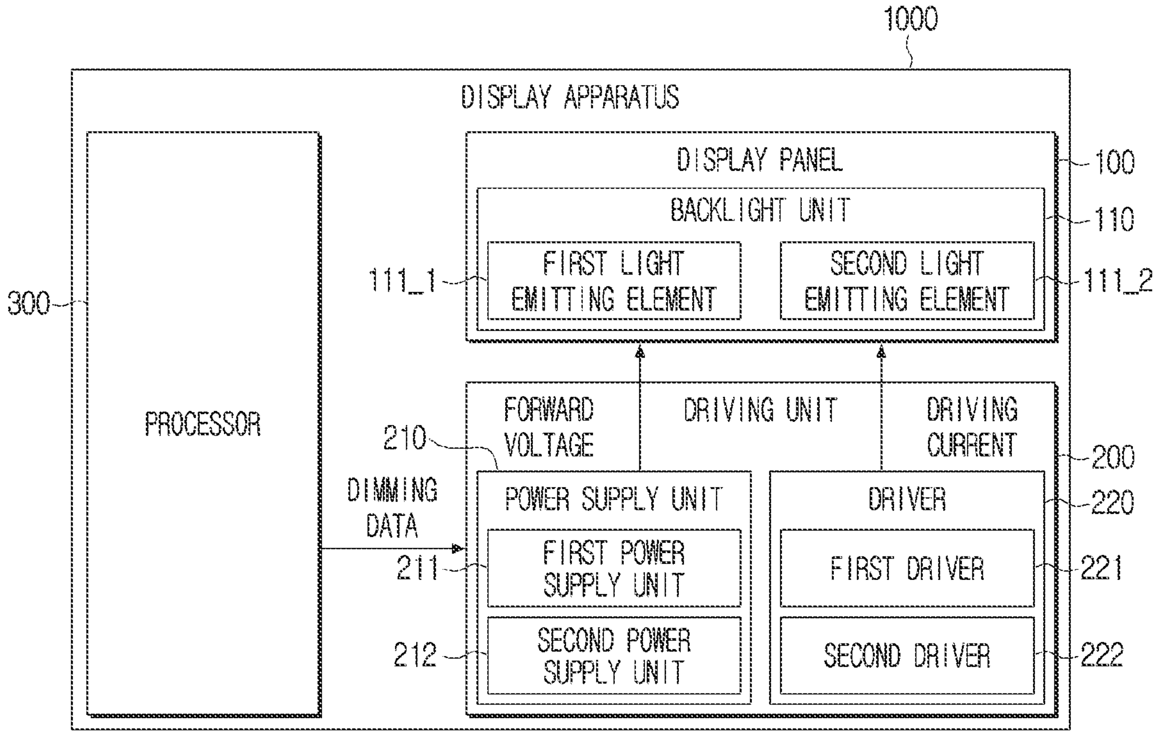
FIG. 4 is a block diagram illustrating an example configuration of a display apparatus according to various embodiments.

FIG. 4 is a block diagram illustrating an example configuration of a display apparatus according to various embodiments.

Referring to FIG. 4, the display panel 100 of the display apparatus 1000 includes the backlight unit (e.g., including a backlight) 110, and the driving unit 200 includes a first power supply unit (e.g., including a power supply) 211, a second power supply unit (e.g., including a power supply) 212, a first driver (e.g., including circuitry) 221, and a second driver (e.g., including circuitry) 222.

As described above, the display panel 100 of the display apparatus according to an embodiment of the disclosure is implemented as a liquid crystal element which is not self-emissive. Therefore, according to an embodiment of the disclosure, the display apparatus 1000 includes a backlight unit 110 for providing light from the rear surface of the display panel 100 in order to display a specific image on the display panel 100.

The backlight unit 110 may include a plurality of light sources and the plurality of light sources may include a linear light source like a lamp or a point light source light a light emitting diode, but is not limited thereto. The backlight unit 110 may be implemented as a direct type backlight unit or an edge type backlight unit.

The light source of the backlight unit 110 may include one or two or more light sources among a light emitting diode (LED), a hot cathode fluorescent lamp (HCFL), a cold cathode fluorescent lamp (CCFL), an external electrode fluorescent lamp (EFEL), an ELP, and FFL, but is not limited thereto. In addition, the LED module may include a plurality of LED pixels. According to an example, the LED pixel may be implemented with a blue LED or a white LED, but is not limited thereto and may be implemented in a format to include at least one of red LED, green LED, or blue LED.

Figure 5:
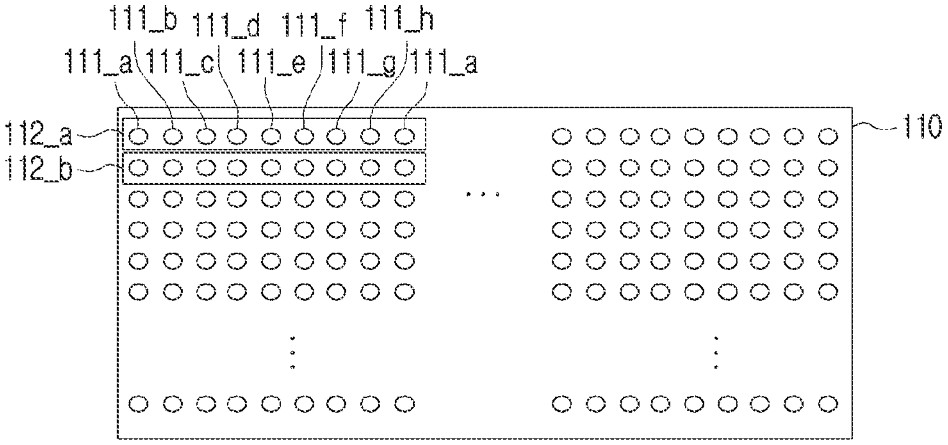
FIG. 5 is a diagram illustrating an example backlight unit according to various embodiments.

FIG. 5 is a diagram illustrating an example backlight unit according to various embodiments.

Referring to FIG. 5, according to an embodiment of the disclosure, the backlight unit 110 includes a plurality of light emitting elements (111_*a* . . . 111_*i*, hereinafter referred to as 111) disposed (or arranged) in a matrix format. That is, the backlight unit 110 includes a light source array. The light source array includes a plurality of row lines or a plurality of column lines.

In the meantime, according to an embodiment of the disclosure as described above, the processor 300 may identify a screen corresponding to the display panel 100 as a plurality of regions and drive the backlight unit 110 with local dimming for individually controlling backlight luminance for each region. For this, the backlight unit 110 may be divided into a plurality of light emitting blocks. Each of the plurality of light emitting blocks may include at least one light emitting element 111, and according to an embodiment of the disclosure, each of the plurality of light emitting blocks may correspond to different regions that do not overlap the backlight unit 110.

For example, referring to FIG. 5, the backlight unit 110 includes a plurality of light emitting blocks (112_*a*, 112_*b*, 112_*c* . . . 112_*i*, hereinafter referred to as 112). At this time, the first light emitting block 112_*a* includes nine light emitting elements 111_*a* to 111_*i*) on the light source array. In the meantime, though not clearly illustrated in the drawings, a second light emitting block 112_*b* to a ninth light emitting block 112_*i* corresponding to regions different from the first light emitting block 112_*a* include nine light emitting elements not overlapping with 9 light emitting elements included in the first light emitting block. In the meantime, preferably, the number of light emitting elements included in each light emitting block is the same, but is not limited thereto. In addition, although the number of light emitting elements included in each light emitting block is nine in FIG. 5, the number is not limited thereto, and the number of elements included in the light emitting block may be variously set according to the use, size, and the like of the display apparatus.

In the meantime, the backlight unit 110 may be divided into a plurality of blocks including a predetermined number of light emitting blocks. Hereinafter, a block including a plurality of light emitting blocks is referred to as a main block. That is, if the light emitting block 112 including the light emitting element described above is referred to as a sub-block, the backlight unit 110 may be divided into a plurality of main blocks 113 including a plurality of sub-blocks 112. At this time, each of the plurality of main blocks 113 includes a plurality of sub-blocks 112 that do not overlap, and thus may correspond to different regions that do not overlap the backlight unit 110.

For example, it is assumed that 2,160 LED modules are disposed on the backlight unit 110. When dividing the backlight unit 110 into a light source block (or a sub-block) 112 including nine LED modules that do not overlap each other, the backlight unit 110 includes 240 light source blocks (or sub-blocks). When dividing the backlight unit 110 into the main block 113 including 24 light source blocks (or sub-blocks) that do not overlap again, the backlight unit 110 includes ten main blocks.

Figure 6:
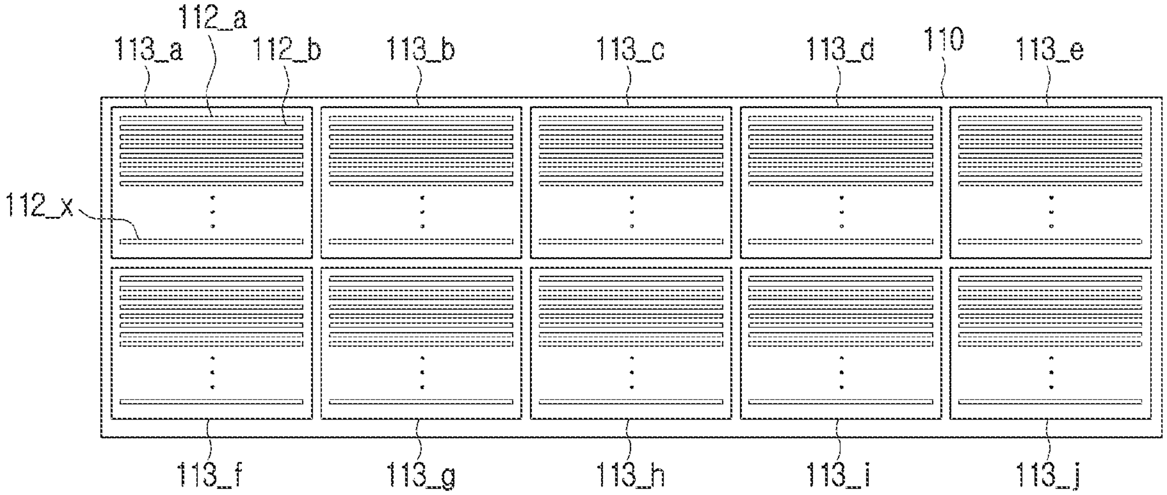
FIG. 6 is a diagram illustrating a backlight unit divided into main blocks according to various embodiments.

FIG. 6 is a diagram illustrating an example backlight unit divided into main blocks according to various embodiments.

Referring to FIG. 6, the backlight unit 110 is divided into 10 main blocks 113 including 24 sub-blocks including a plurality of light emitting elements. That is, the backlight unit includes ten main blocks 113 corresponding to regions that do not overlap each other. Specifically, the first main block 113_*a* includes 24 sub-blocks 112_*a* to 112_*x*. Although not clearly shown in the drawings, the second main block 113_*b* also includes 24 sub-blocks 112 like the first main block 113_*a*.

Referring back to FIG. 4, according to an embodiment of the disclosure, the driving unit 200 includes the first power supply unit 211, the second power supply unit 212, the first driver 221, and the second driver 222.

The first power supply unit 211 and a second power supply unit 212 supply power to the light emitting element 111 arranged in the backlight unit 110 through an output terminal of the first driver 221 and the second driver 222. More specifically, the first power supply unit 211 and the second power supply unit 212 provide voltages to a plurality of light emitting elements 111 included in a block which is not overlapped. When describing the above example again, when the first power supply unit 211 supplies power to a light emitting element included in six blocks among 10 blocks, the second power supply unit 212 may supply power to the light emitting elements included in the remaining four blocks.

That is, if the first power supply unit 210 corresponds to M (M is a natural number of 1 or more and N or less) blocks among N blocks (where N is a natural number greater than or equal to 2) and provides power to a plurality of light emitting elements 111 included in M blocks, the second power supply unit 212 corresponds to M-N blocks and provides power to a plurality of light emitting elements 111 included in the corresponding M-N blocks. In the meantime, each of the power supply units 211, 212 provides a forward voltage Vf to a light emitting element included in a corresponding block through output terminals 223, 224 corresponding to each block in the drivers 221, 222. This will be described in detail below.

In the meantime, the first driver 221 and the second driver 222 respectively correspond to a plurality of light emitting elements included in different main blocks 113 as described above. Referring back to FIG. 6, assuming that the backlight unit 110 of the display apparatus 1000 includes ten main blocks 113, the first driver 221 and the second driver 222 supply current to the plurality of light emitting elements 111 included in the five main blocks 113, respectively.

In addition, when describing the above example, if the first driver 221 supplies current to the plurality of light emitting elements included in the first main block 113_1 to fifth main block 113_5, the second driver 222 supplies current to the plurality of light emitting elements included in the sixth main block 113_6 to the tenth main block 113_10. More specifically, assuming that each main block includes 24 sub-blocks 112 and each sub-block 112 includes nine light emitting elements, the first driver 221 and the second driver 222 supply current to 1080 light emitting elements 111 that do not overlap, respectively. As described above, the first driver 221 and the second driver 222 respectively supply current to a plurality of light emitting elements 111 included in different main blocks 113. Accordingly, the plurality of light emitting elements 111 may be divided according to a driver receiving a current. Specifically, the light emitting element 111 driven by the first driver 221 may correspond to the first light emitting element 111_1, and the light emitting element driven by the second driver 222 may correspond to the second light emitting element 111_2.

In the meantime, the first driver 221 and the second driver 222 respectively include output terminals 223, 224 corresponding to respective main blocks 113. When describing the example again, in the case of the first driver 221 for supplying current to the light emitting element 111 included in the first main block 113_1 to the fifth main block 113_5, five output terminals 223_1, 223_2, 223_3, 223_4, and 223_5 corresponding to each main block are included. In addition, even in the case of the second driver 222 for supplying a current to the light emitting element 111 included in the sixth main block 113_6 to a tenth main block 113_10, five output terminals 224_1, 224_2, 224_3, 224_4, and 224_5 corresponding to each main block are included. The output terminal will be described in detail with reference to FIGS. 7 and 8.

Figure 7:
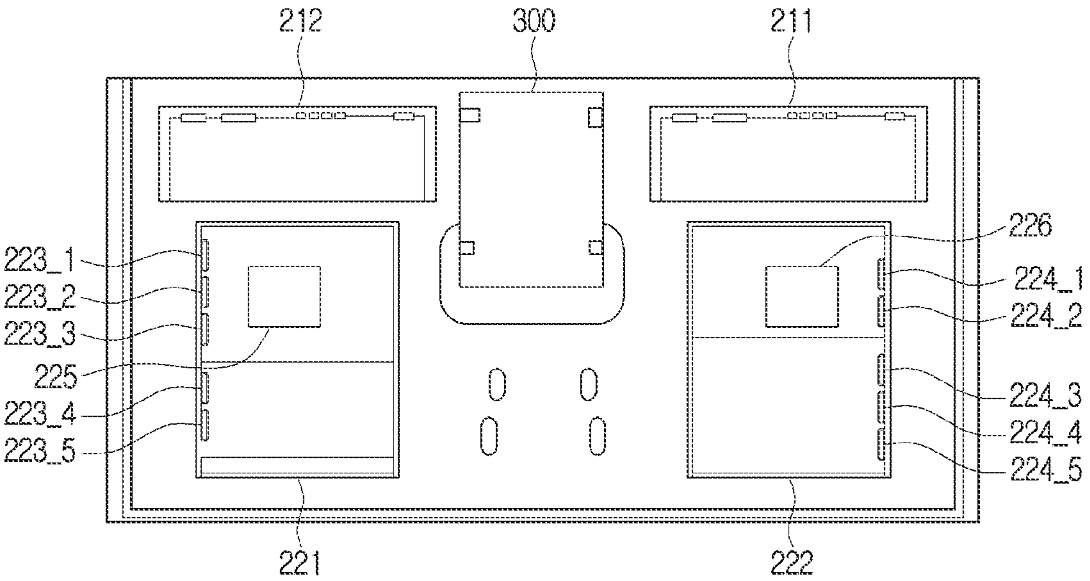
FIG. 7 is a diagram illustrating an example layout of a driving unit and a processor of a display apparatus according to various embodiments.

FIG. 7 is a diagram illustrating an example layout of a driving unit and a processor of a display apparatus according to various embodiments.

Referring back to FIG. 2, as described above, in the display apparatus according to an embodiment of the disclosure, a space in which the power supply unit 210 and the driver 220 included in the driving unit 200 may be disposed is narrow due to the heat exchanger 400 having a large volume, and thus the size of the power supply unit 210 and the driver 220 may also be limited. Therefore, voltage is supplied separately to a plurality of light emitting elements 111 corresponding to each local region using a plurality of power supply units (the first power supply unit 211 and the second power supply unit 212), which are not a single power supply unit, and current is supplied to a plurality of drivers 111 corresponding to each local region using a plurality of drives (the first driver 221 and the second driver 222).

Referring to FIG. 7, the first power supply unit 211 and the second power supply unit 212 are connected to an output terminal 223 of each first driver 221 and an output terminal 224 of the second driver 222. As described above, the first power supply unit 211 and the second power supply unit 212 provide a forward voltage (Vf) to a plurality of light emitting elements 111 included in a block corresponding to output terminals 223, 224 through connected output terminals 223, 224, respectively.

In the meantime, each output terminal 223, 224) included in each of the first driver 221 and the second driver 222 includes a plurality of pins. At this time, forward voltage (Vf) supplied from the power supply unit 210 through some of the plurality of pins is applied to the plurality of light emitting elements 111 included in the main block 113 corresponding to the corresponding output terminal. In the meantime, the remaining pins other than the above-described some pins among the plurality of pins correspond to respective sub-blocks included in the main block corresponding to the corresponding output terminals 223, 224. For example, assuming that an output terminal includes 30 pins, 24 pins are connected to a feedback line corresponding to each of 24 sub-blocks included in the corresponding main block, and the remaining six pins are used to apply a forward voltage (Vf) supplied from a power supply unit to a plurality of light emitting elements included in the corresponding main block.

In the meantime, referring back to FIG. 7, the first driver 221 and the second driver 222 include output terminals simultaneously connected to the first power supply unit and the second power supply unit among a plurality of output terminals 223, 224 included in the first driver 221 and the second driver 222, respectively. Specifically, only the first power supply unit 211 is connected to three output terminals 223_3, 223_4, 223_5 located at a lower portion among five output terminals of the first driver 221, but the first power supply unit 211 and the second power supply unit 212 are selectively connected through a first switching unit 225 to two output terminals 223_1, 223_2 located in an upper portion. This is the same for the second driver 222. The first power supply unit 211 and the second power supply unit 212 are selectively connected to two output terminals 224_1, 224_2 located in an upper portion of the second driver 222 through a second switching unit 226.

Hereinafter, an output terminal, to which only the first power supply unit 211 is connected, is referred to as an output terminal 223_*a*, 224_*a* of a first type, and an output terminal selectively connected to a first power supply unit and a second power supply unit through a switching unit (a first switching unit 225 and a second switching unit 226) is referred to as a second type output terminal 223_*b*, 224_*b*.

Therefore, the first driver 221 includes three first types of output terminals 223_*a* (hereinafter, first output terminals) and two second types of output terminals 223_*b* (hereinafter, second output terminals), and the second driver 222 also includes three first types of output terminals 224_*a* (hereinafter, third output terminals) and two second types of output terminals 224_*b* (hereinafter, fourth output terminals).

Meanwhile, types of the plurality of light emitting elements 111 may be divided in accordance with output terminals 223_*a*, 223_*b*, 224_*a*, 224_*b*. That is, a plurality of light emitting elements included in a main block receiving a voltage only by the first power supply unit 211 correspond to a first type of light emitting element 115, and a plurality of light emitting elements included in a main block selectively receiving a voltage from a first power supply unit or a second power supply unit correspond to a second type of light emitting element 116. Referring back to FIG. 7, the plurality of light emitting elements included in the main block 113 corresponding to the second output terminal 223_*b* included in the first driver 221 and the fourth output terminal 224_*b* included in the second driver 222 correspond to the second type of light emitting element 116.

Meanwhile, the first light emitting element 111_1 and the second light emitting element 111_2 described above are divided according to a driver receiving a current, whereas the first-type light emitting element 115 and the second-type light emitting element 116 are divided according to a method for receiving power. Therefore, among the plurality of first light emitting elements 111_1 according to an embodiment of the disclosure, first light emitting elements 115_1, 116_1 corresponding to the first-type light emitting element 115 and the second-type light emitting element 116 are included, and likewise, among the plurality of second light emitting elements 111_2, a first-type light emitting element 115_2 and a second-type light emitting element 116_2 are included.

Hereinbelow, an example method for changing the power supply units 211, 212 for providing a voltage to a light emitting element by controlling a first switching unit 225 and a second switching unit 226 based on a luminance value input by a user is described in greater detail.

Hereinafter, a method of simultaneously driving a plurality of light emitting elements 111 by the first power supply unit 211 and the second power supply unit 212 may be referred to as a first driving method, and a method of driving a plurality of light emitting elements 111 only by the first power supply unit 211 may be referred to as a second driving method.

Figure 8:
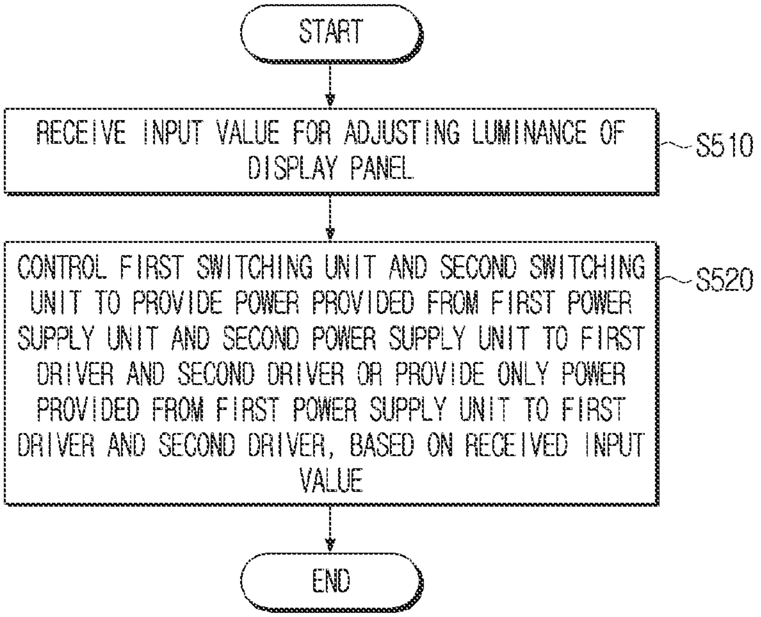
FIG. 8 is a flowchart illustrating an example method for controlling a display apparatus according to various embodiments.

FIG. 8 is a flowchart illustrating an example method for controlling a display apparatus according to various embodiments.

Referring to FIG. 8, the processor 300 receives an input value for adjusting the luminance of a display panel of a user through an interface (not shown) or a communicator (not shown) in operation S510. The first switching unit 225 and the second switching unit 226 are controlled based on the received input value, and the power supplied from the first power supply unit 211 and the second power supply unit 212 is provided to the first driver 221 and the second driver 222, or only the power supplied from the first power supply unit 211 is provided to the first driver 221 and the second driver 222 in operation S520.

For example, the processor 300 sets the driving method of the light emitting element 111 to a first driving method or a second driving method based on an input value received from a user. A driving mode of the display apparatus 1000 may be set according to a luminance value of the display panel 100. If the luminance value of the display panel 100 is equal to or greater than a predetermined second value, the display panel corresponds to a normal driving mode, and if the luminance value of the display panel is less than a predetermined first value, the display panel 100 corresponds to a power saving driving mode.

In the normal driving mode, the processor 300 drives the light emitting element according to a first driving method. For example, the processor 300 supplies power supplied from the first power supply unit 211 to a first type of light emitting element 115 through the first output terminal 223_*a* and the third output terminal 224_*a* included in each of the first driver 221 and the second driver 222, and supplies power supplied from the second power supply unit 212 to the second type light emitting element 116 through the second output terminal 223_*b* included in the first driver 221 and a fourth output terminal 224_*b* included in the second driver 222. That is, each of the power supply units (the first power supply unit 211 and the second power supply unit 212) provides a forward voltage Vf to a plurality of light emitting elements that do not overlap.

In the meantime, according to an embodiment of the disclosure, the processor 300 may, based on receiving an input (e.g., a user input) for lowering the brightness of the display panel 100 to a predetermined brightness while the power supplied from the first power supply unit 211 and the second power supply unit 212 is provided to the first driver 221 and the second driver 222, control the first switching unit 225 and the second switching unit 226 so that only power supplied from the first power supply unit 211 is provided to the first driver 221 and the second driver 222.

For example, the processor receives an input of a user adjusting a luminance value of the display panel 100 through an interface (not shown), and compares the input value with a predetermined value. In addition, when the input value is less than a predetermined value, the processor 300 controls the first switching unit 225 and the second switching unit 226 to change the power supply unit 210 connected to the second output terminal and the fourth output terminal from the second power supply unit 212 to the first power supply unit 211. Through this, only the voltage provided by the first power supply unit 211 is applied to the backlight unit 110 of the display apparatus 1000.

Here, in an embodiment of the disclosure, a predetermined brightness (first reference value) that is a reference for controlling the first switching unit 225 and the second switching unit 226 or a reference for changing from the first driving method to the second driving method may be set based on a maximum luminance value capable of supplying power to the entire backlight unit 110 by one power supply unit 210. More preferably, the predetermined value may be set to a value corresponding to a predetermined ratio (first ratio) of the maximum luminance value capable of driving the entire backlight unit 110 by one power supply unit 210 of the display apparatus 1000. For example, if it is assumed that a maximum luminance value capable of effectively supplying power to the entire light emitting element 111 included in the backlight unit 110 is 50 cd/m2, and a predetermined ratio is 0.8, a predetermined value may be set to 40 cd/m2. As described above, not setting the predetermined value to be equal to the maximum luminance value is to secure a power margin of the display apparatus 1000.

Figure 9A:
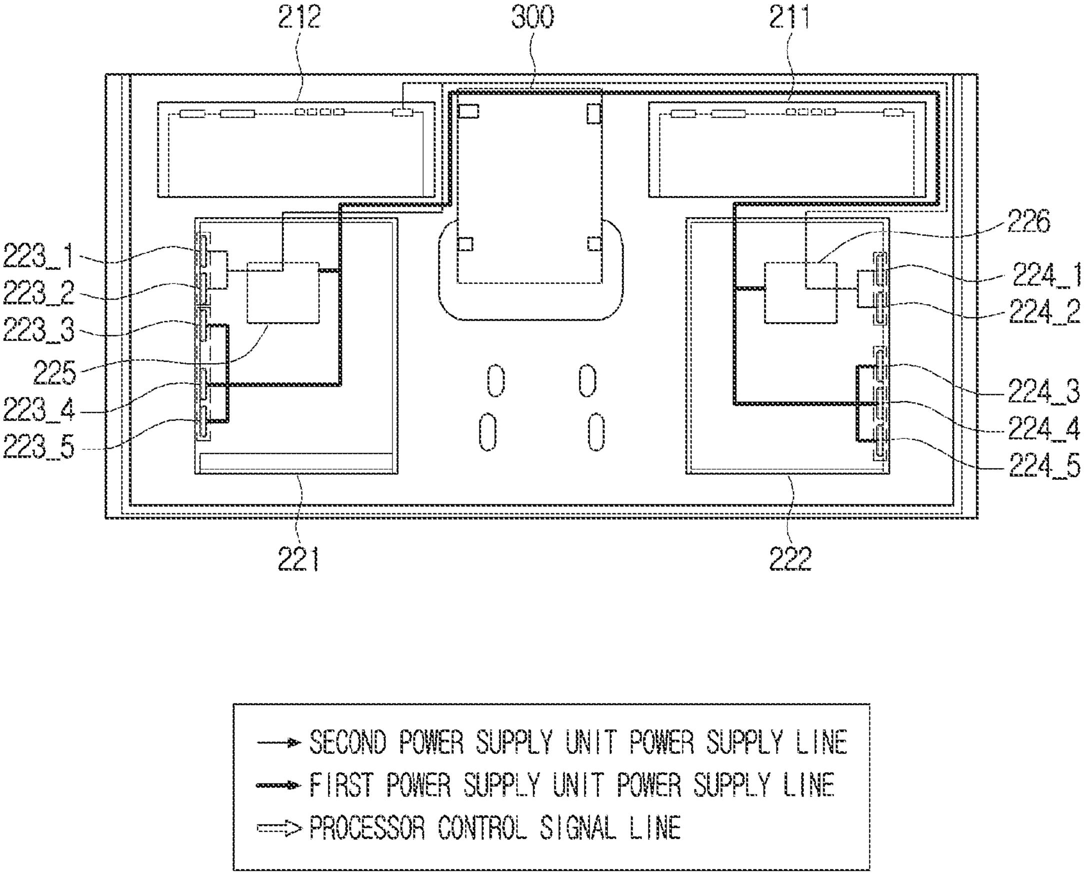
FIGS. 9A, 9B and 9C are diagrams illustrating driving a light emitting element with only a first power supply unit according to various embodiments.
Figure 9B:
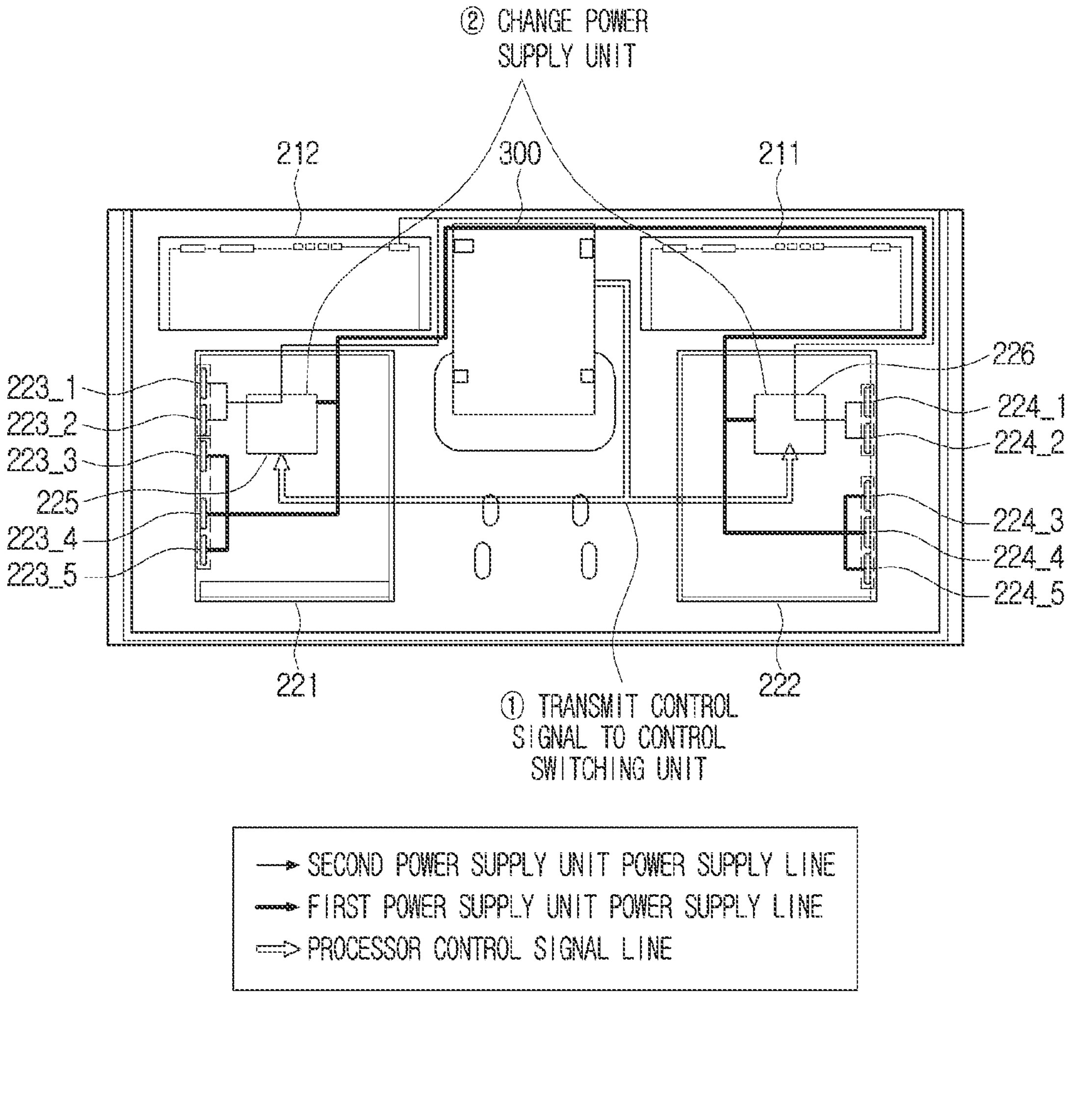
Figure 9C:
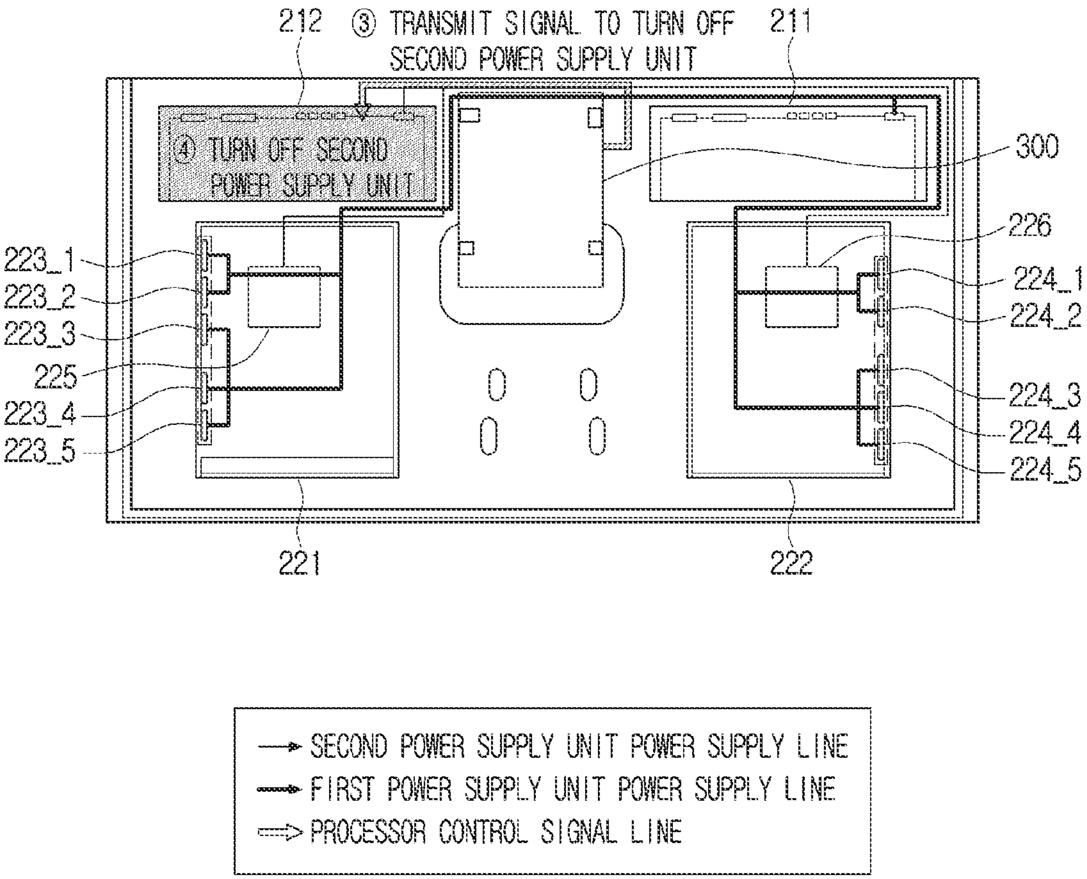

FIGS. 9A, 9B and 9C are diagrams illustrating examples of driving a light emitting element with only a first power supply unit according to various embodiments.

Referring to FIG. 9A, in a normal driving mode, the first power supply unit 211 and the second power supply unit 212 provide voltages to the first driver 221 and the second driver 222, respectively. Specifically, the first power supply unit 211 provides a forward voltage to the light emitting element 115 of a first type among the first light emitting element 111_1 included in a main block corresponding to each of three first output terminals 223_3, 223_4, 334_5 in the first driver 221. In addition, the first power supply unit 211 provides a forward voltage to the light emitting element 115 of a first type among second light emitting elements 111_2 included in the main block corresponding to each of three third output terminals 224_3, 224_4, 224_5 in the second driver 222.

Meanwhile, the second power supply unit 212 provides a forward voltage to the light emitting element 116 of a second type among second light emitting elements 111_2 included in the main block corresponding to each second output terminal through two second output terminals 223_1, 223_2 in the first driver 221. In addition, a forward voltage is provided to the light emitting element 116 of a second type among the second light emitting element 111_2 included in the main block corresponding to each fourth output terminal through two fourth output terminals 224_1, 224_2 in the second driver.

Referring to FIG. 9B, when a user input for lowering the brightness of the display panel 100 to a predetermined brightness is received while the power supplied from the first power supply unit 211 and the second power supply unit 212 is provided to the first driver 221 and the second driver 222, the processor 300 changes the display driving mode from the normal driving mode to the power saving driving mode, and transmits a control signal for controlling the first switching unit 225 in the first driver 221 and the second switching unit 226 in the second driver 222 to each of the first switching unit 225 and the second switching unit 226.

Through this, the first switching unit 225 in the first driver 221 is controlled to change a power supply unit for supplying power through the second output terminals 223_1, 223_2 from the second power supply unit 212 to the first power supply unit 211. In addition, a power supply unit for supplying power through the fourth output terminals 224_1, 224_2 by controlling the second switching unit 226 in the second driver 222 is also changed from the second power supply unit 212 to the first power supply unit 211. That is, the processor 300 controls the switching unit (the first switching unit 225 and the second switching unit 226) to change the power path for the second output terminal and the fourth output terminal from the second power supply unit 212 to the first power supply unit 211.

In addition, referring to FIG. 9C, in the power saving driving mode, the processor 300 supplies only a voltage provided by the first power supply unit 211 to the entire light emitting element 111 in the backlight unit 110 of the display apparatus 1000 according to a second driving method. Meanwhile, the processor 300 controls the first switching unit 225 and the second switching unit 226 so that only the power supplied from the first power supply unit 211 is provided to the first driver 221 and the second driver 222, and then may turn off the second power supply unit 212. For this, the processor 300 transmits a control signal for turning off the power of the second power supply unit 212 to the second power supply unit 212.

That is, in a luminance value corresponding to a user input that lowers to a predetermined brightness, the display apparatus 1000 may be driven with only the first power supply unit 211 and the power of the second power supply unit 212 that does not supply power is turned off. According to the disposition of the heat exchanger, there is an effect that the power consumption of the display apparatus 1000 including the plurality of power supply units, the first power supply unit 211, and the second power supply unit 212 is reduced. Specifically, instead of a driving method of a display apparatus in which the first power supply unit 211 and the second power supply unit 212 need to be always turned on to drive the backlight unit 110, the display apparatus 1000 may selectively turn off power of remaining power supply units (second power supply unit 212) for a luminance value that may be driven with only one power supply unit (first power supply unit 211). Accordingly, power consumption that is generated in driving a plurality of power supply units may be reduced.

Figure 10:
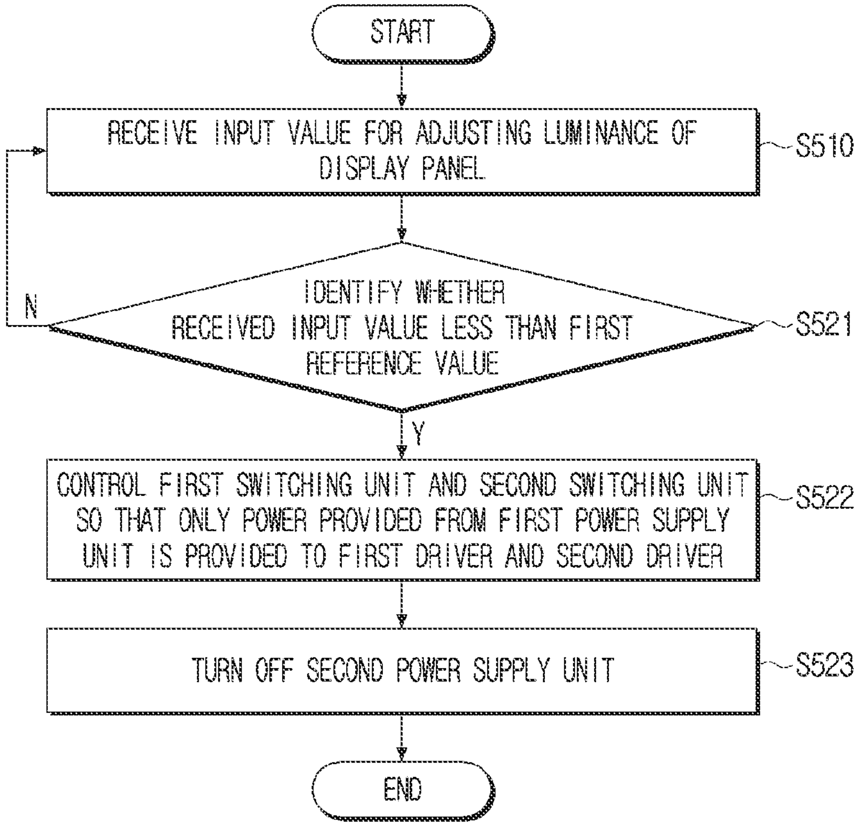
FIG. 10 is a flowchart illustrating an example method for controlling a display apparatus to drive a light emitting element with only a first power supply unit based on a user input according to various embodiments.

FIG. 10 is a flowchart illustrating an example method for controlling a display apparatus to drive a light emitting element with only a first power supply unit based on a user input according to various embodiments.

Referring to FIG. 10, when the processor 300 receives a user input for adjusting the luminance of the display panel in operation S510, the processor 300 identifies whether the received user input value is less than a value (a first reference value) corresponding to a predetermined first brightness of the display panel while the power supplied from the first power supply unit 211 and the second power supply unit 212 is provided to the first driver 221 and the second driver 222 in operation S521. If the user's input is less than the first reference value, the first switching unit 225 and the second switching unit 226 are controlled such that only the power supplied from the first power supply unit 211 is provided to the first driver 221 and the second driver 222 in operation S522.

In addition, the processor 300 may, after controlling the first switching unit 225 and the second switching unit 226 to provide only power supplied from the first power supply unit 211 to the first driver 221 and the second driver 222 in operation S522, turn off the second power supply unit 212 in operation S523. The detailed description thereof is provided so further description may not be repeated here.

In the meantime, according to an embodiment of the disclosure, the processor 300 may, based on receiving a user input to increase brightness of the display panel to predetermined brightness while the power supplied from the first power supply unit 211 is provided to the first driver 221 and the second driver 222, turn on the second power supply unit 212.

According to the second driving method as described above, the processor applies a forward voltage to the entire light emitting element of the display apparatus 1000 using only the first power supply unit 211. Specifically, the processor applies a power provided to the first power supply unit 221 to the first type light emitting element of the first light emitting element through the first output terminal of the first driver 221, and applies a voltage to a second type light emitting element of the first light emitting element through a second output terminal. In addition, the processor applies power provided to the first power supply unit 211 to a first type light emitting element of the second light emitting element through a third output terminal of the second driver 222, and to a second type light emitting element of the second light emitting element through a fourth output terminal.

In the meantime, when a user input for increasing the brightness of the display panel to a predetermined brightness is received, the processor turns on the power of the second power supply unit 212 in a power-off state.

For example, when a user input for adjusting a luminance value of the display panel to a predetermined brightness is received, the processor 300 compares the input of the user with a predetermined brightness (second reference value), and returns the display driving mode from the power saving driving mode to the normal driving mode when the user's input matches the predetermined brightness (second reference value). Accordingly, the processor 300 changes the driving method from the second driving method in the power saving mode to the first driving mode which is the normal driving mode. However, unlike changing the normal driving mode to the power saving driving mode, the processor 300 turns on the power of the second power supply unit 212 in the off state before the driving method change. When the normal driving mode is changed from the normal driving mode to the power saving driving mode, it is distinguished from turning off the power of the second power supply unit 212 after changing the driving method.

Here, a predetermined brightness (a second reference value) which becomes a reference for turning on the power of the second power supply unit 212, which is a power-off state, may be set based on the maximum luminance value capable of supplying power to the entire backlight unit by one power supply unit. The predetermined value may be set to a value corresponding to a predetermined ratio (second ratio) of the maximum luminance value of the display apparatus. For example, if a maximum luminance value capable of effectively supplying power to the entire light emitting element included in a backlight unit is 50 cd/m2, and a predetermined ratio is 0.9, a predetermined value may be set to 45 cd/m2. As described above, not setting the predetermined value to match the maximum luminance value is to secure a power margin of the display apparatus.

Meanwhile, the first reference value corresponds to a reference for the processor 300 to control the first switching unit 225 and the second switching unit 226 or change from the first driving method to the second driving method, whereas the second reference value is the reference for the processor 300 to turn on the second power supply unit 212 which is in the power-off state, and thus, the subjects of each reference value are different.

In the meantime, according to an embodiment of the disclosure, the first reference value and the second reference value may be set to the same value.

In the meantime, according to an embodiment of the disclosure, the processor may, after turning on the second power supply unit 212, control the first switching unit 225 and the second switching unit so 226 that power supplied from the first power supply unit 211 and the second power supply unit 212 are provided to the first driver 221 and the second driver 222.

For example, so that the display apparatus 1000 is driven from the second driving method to the first driving method, the processor 300 controls the first switching unit 225 in the first driver 221 to change a power supply unit supplying power to a second output terminal from the first power supply unit 211 to the second power supply unit 212. In addition, the processor 300 controls a second switching unit 226 in the second driver 222 to change a power supply unit for supplying power to the fourth output terminal from the first power supply unit 211 to the second power supply unit 212. That is, the processor 300 controls the switching unit (the first switching unit 225 and the second switching unit 226) to change the power path for the second output terminal and the fourth output terminal from the first power supply unit 211 to the second power supply unit 212.

Figure 11:
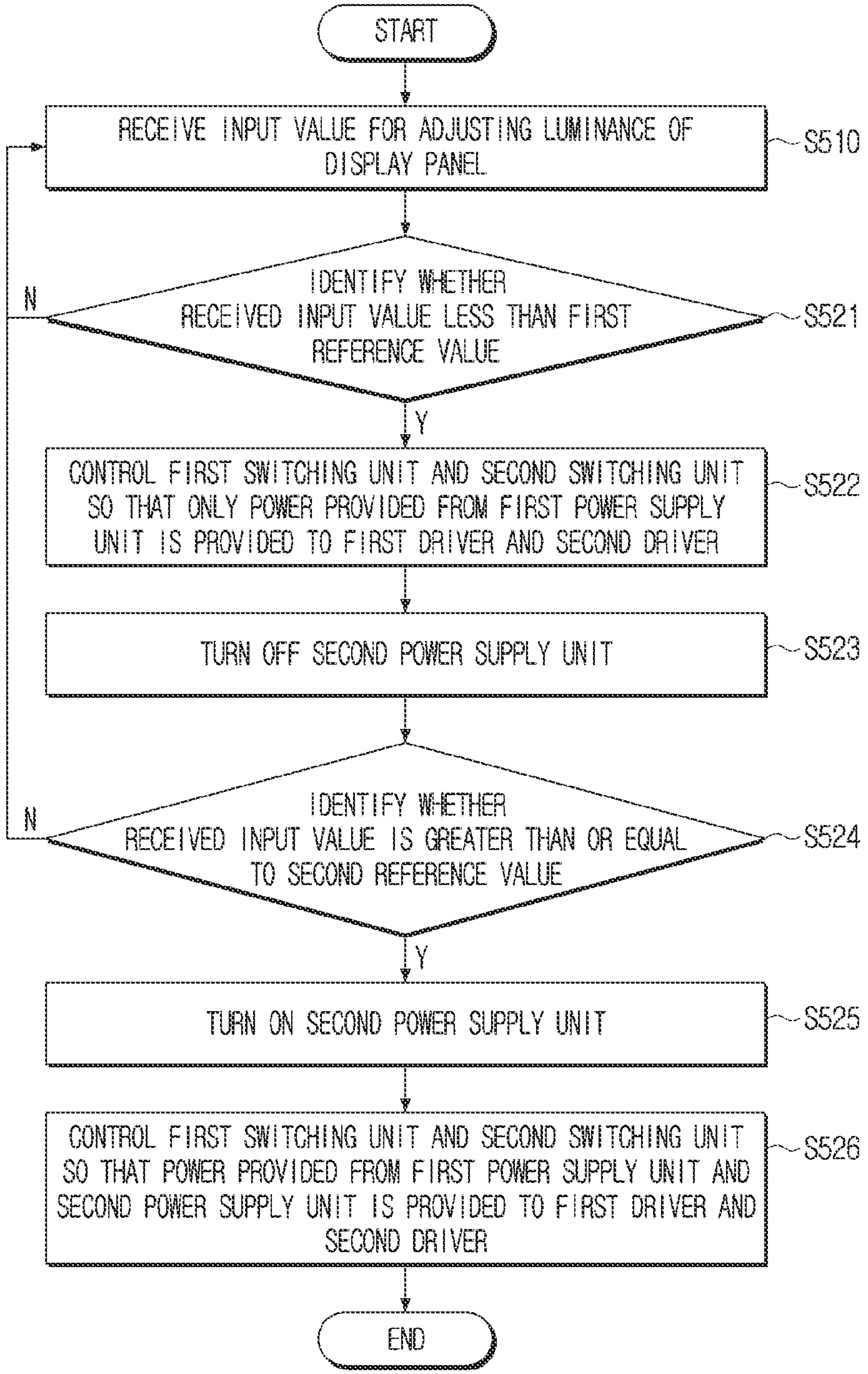
FIG. 11 is a flowchart illustrating an example method for controlling a display apparatus to drive a light emitting element from a first power supply unit and a second power supply unit in a manner in which a light emitting element is driven only by a first power supply unit based on a user input according to various embodiments.

FIG. 11 is a flowchart illustrating an example method for controlling a display apparatus to drive a light emitting element from a first power supply unit and a second power supply unit in a manner in which a light emitting element is driven only by a first power supply unit based on a user input according to various embodiments.

Referring to FIG. 11, when a user input for increasing the brightness of the display panel to a predetermined brightness is received while power supplied from the first power supply unit 211 is provided to the first driver 221 and the second driver 222 (while driving the display apparatus according to a second driving method), the processor 300 identifies whether the received user input value is equal to or greater than a value (second reference value) corresponding to a predetermined second brightness of the display panel in operation S524.

If the received user input is greater than or equal to the second reference value, the processor 300 turns on the second power supply unit 212 in operation S525. In addition, the processor 300 controls the first switching unit 225 and the second switching unit 226 to provide power supplied from the first power supply unit 211 and the second power supply unit 212 to the first driver 221 and the second driver 222 after turning on the second power supply unit 212 in operation S526. A detailed description thereof will be omitted.

Meanwhile, according to an embodiment of the disclosure, the display apparatus 1000 may change the driving method of the display apparatus 1000 when a predetermined time (a first reference time) arrives. For example, if it is assumed that the first reference time is 11 pm, the first switching unit 225 and the second switching unit 226 may be controlled to change the driving method of the display apparatus 1000 from the first driving method to the second driving method when the first reference time arrives at 11 pm. This is to reduce power consumption by changing the driving method to the second driving method and turning off the power of the second power supply unit 212 during the time with low floating population.

Meanwhile, if a predetermined time (a second reference time) arrives after turning off the second power supply unit 212, the processor 300 may turn on the power of the second power supply unit 212 of the display apparatus 1000. After turning on the power of the second power supply unit 212, the processor 300 may change the driving method of the display apparatus 1000 from the second driving method to the first driving method. For example, when it is assumed that the second reference time is 6 AM, if 6 AM arrives, the processor 300 turns on the power of the second power supply unit 212 in a power-off state and controls the first switching unit 225 and the second switching unit 226. That is, the processor 300 controls the first switching unit 225 and the second switching unit 226 so that power supplied from the first power supply unit 211 and the second power supply unit 212 may be applied to the first driver 221 and the second driver 222.

Figure 12:
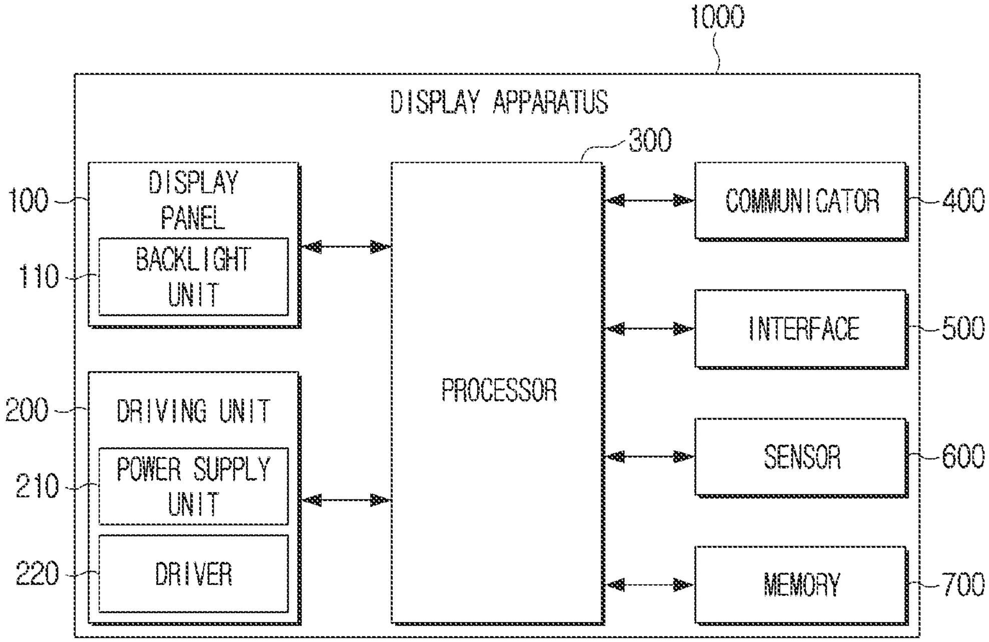
FIG. 12 is a block diagram illustrating an example configuration of a display apparatus according to an embodiment of the disclosure.

FIG. 12 is a block diagram illustrating an example configuration of a display apparatus according to various embodiments.

Referring to FIG. 12, the display apparatus 1000 includes the display panel 100, the driving unit 200, the processor 300, the heat exchanger 400, a communicator 600, a sensor 700, an interface 800, and a memory 900. Detailed descriptions of the display panel 100, the driving unit 200, the processor 300, and the heat exchanger 400 have been described above and the further details may not be provided.

The display apparatus 1000 may communicate with various external devices using a wireless communication technology or a mobile communication technology through the communicator (e.g., including communication circuitry) 400. For example, the display apparatus 1000 may receive an input value for adjusting the luminance of the display panel 100 through the communicator 400. In addition, the display apparatus 1000 may transmit and receive image information from an external device. The wireless communication technology may include, for example, Bluetooth, Bluetooth low energy, CAN communication, Wi-Fi, Wi-Fi Direct Connect, Ultra-Wide Band (UWB), ZigBee, Infrared Data Association (IrDA), Near Field Communication (NFC), or the like, and mobile communication technology may include 3GPP, Wi-Mas, long term evolution (LTE), 5G, or the like.

The sensor 600 may obtain various information related to the display apparatus 1000. For example, the sensor 600 may include a global positioning system (GPS) capable of acquiring location information of the display apparatus 1000, or may also include a clock sensor capable of measuring a time when the display apparatus 1000 is driven. In addition, various sensors such as a motion sensor for sensing movement of the display apparatus 1000 and the like may be included.

The interface (e.g., including circuitry) 500 may be provided to be connectable to another device, for example, an external storage device, provided separately from the display apparatus 1000. For example, the display apparatus 1000 may receive an input value for adjusting the luminance of the display panel 100 from a user through the interface 800. In the meantime, the interface 800 may be a Universal Serial Bus (USB) terminal, and may include at least one of various interface terminals such as a High Definition Multimedia Interface (HDMI) terminal, a Thunderbolt terminal, and the like.

In the memory 700, an operating security system (O/S) for driving the display apparatus 1000 may be stored. Also, a software program or an application for operating the display apparatus 1000 may be stored in the memory 700 according to various embodiments of the disclosure.

Meanwhile, in the above description, operations S510 to S526 may be further divided into additional steps, or combined into fewer steps, according to embodiments of the disclosure. In addition, some operations may be omitted if necessary, and the order between operations may be changed. In addition, even for other omitted contents, the contents of the display apparatus of FIGS. 1 to 9 may also be applied to the display control method of FIGS. 10 to 11.

Various embodiments of the disclosure may be implemented as software that includes instructions stored in machine-readable storage media readable by a machine (e.g., a computer). A device may call instructions from a storage medium and that is operable in accordance with the called instructions, including a device according to various example embodiments. When the instruction is executed by a processor, the processor may perform the function corresponding to the instruction, either directly or under the control of the processor, using other components. The instructions may include a code generated or executed by the compiler or interpreter. The machine-readable storage medium may be provided in the form of a non-transitory storage medium. Here, the "non-transitory" storage medium does not include a signal (e.g., electromagnetic wave) and is tangible, and may not distinguish whether data is permanently or temporarily stored in a storage medium. For example, "non-transitory storage medium" may include a buffer in which data is temporarily stored.

According to embodiments, a method disclosed herein may be provided in software of a computer program product. A computer program product may be traded between a seller and a purchaser as a commodity. A computer program product may be distributed in the form of a machine readable storage medium (e.g., compact disc read only memory (CD-ROM)) or distributed online through an application store (e.g., PlayStore™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

The foregoing example embodiments are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art. It will also be understood that any of the embodiment(s) described herein may be used in conjunction with any other embodiment(s) described herein.

What is claimed is:

1. A display apparatus comprising:

a first power supply unit comprising a power supply;

a second power supply unit comprising a power supply;

a display panel;

a backlight unit including a backlight configured to provide light to the display panel using first light emitting elements and second light emitting elements;

a first driver comprising a plurality of output terminals and configured to drive the first light emitting elements;

a second driver comprising a plurality of output terminals and configured to drive the second light emitting elements;

a first switch circuit configured to selectively connect at least a first output terminal of the plurality of output terminals of the first driver to either the first power supply unit or the second power supply unit;

a second switch circuit configured to selectively connect at least a first output terminal of the plurality of output terminals of the second driver to either the first power supply unit or the second power supply unit; and at least one processor, comprising processing circuitry, configured, individually and/or collectively, to control the first switch circuit and the second switch circuit in a first driving mode so that the first output terminal of the first driver and the first output terminal of the second driver are simultaneously connected to different ones of the first power supply unit and the second power supply unit and to control the first switch circuit and the second switch circuit in a second driving mode so that the first output terminal of the first driver and the first output terminal of the second driver are simultaneously connected to only the first power supply unit, wherein the first or second driving mode is set based on an input for adjusting brightness of the display panel.

2. The display apparatus of claim 1, wherein at least one processor comprising processing circuitry is configured, individually and/or collectively, to:

based on receiving an input for lowering the brightness of the display panel to a specified brightness while the first driving mode is set, control the first switch circuit and the second switch circuit to set the second driving mode.

3. The display apparatus of claim 2, wherein at least one processor comprising processing circuitry, individually and/or collectively, is configured to:

turn off the second power supply unit when the second driving mode is set.

4. The display apparatus of claim 3, wherein at least one processor comprising processing circuitry is configured, individually and/or collectively, based on receiving an input to increase brightness of the display panel to a specified brightness while the second driving mode is set, turn on the second power supply unit.

5. The display apparatus of claim 4, wherein at least one processor comprising processing circuitry is configured, individually and/or collectively, to control the first switch circuit and the second switch circuit so that the first driving mode is set based on turning on the second power supply unit.

6. The display apparatus of claim 5, wherein:

the first driver comprises a second output terminal corresponding to a first type light emitting element and configured to receive power from only the first power supply unit, wherein the first output terminal of the first driver corresponds to a second type light emitting element, the second driver comprises a second output terminal corresponding to the first type light emitting element and configured to receive power from only the first power supply unit, wherein the first output terminal of the second driver corresponds to the second type light emitting element, and at least one processor comprising processing circuitry is configured, individually and/or collectively, based on receiving an input for lowering the brightness of the display panel to a specified brightness based on power supplied from first power supply unit being provided to the first type light emitting element through second output terminal of the first driver and the second output terminal of the second driver and power supplied from the second power supply unit being provided to the second type light emitting element through the first output terminal of the first driver and the first output terminal of the second driver, control the first switch circuit and the second switch circuit such that power supplied from the first power supply unit is provided to the second type light emitting element through the first output terminal of the first driver and the first output terminal of the second driver and turn off the second power supply unit.

7. The display apparatus of claim 6, wherein at least one processor comprising processing circuitry is configured, individually and/or collectively, to:

based on receiving an input for increasing the brightness of the display panel to a specified brightness based on power supplied from the first power supply unit being provided to the second type light emitting element through the first output terminal of the first driver and the first output terminal of the second driver, and the power provided from the first power supply unit being provided to the second type light emitting element through the first output terminal of the first driver and the first output terminal of the second driver, turn on the second power supply unit, and control the first switch circuit and the second switch circuit such that power provided from the second power supply unit is provided to the second type light emitting element through the first output terminal of the first driver and the first output terminal of the second driver.

8. A method of controlling a display apparatus comprising a first power supply unit comprising a power supply, a second power supply unit comprising a power supply, a display panel, a backlight unit configured to provide light to the display panel using first light emitting elements and second light emitting elements, a first driver comprising a plurality of output terminals and configured to drive the first light emitting elements, a second driver comprising a plurality of output terminals and configured to drive the second light emitting elements, a first switch circuit configured to selectively connect at least a first output terminal of the plurality of output terminals of the first driver to either the first power supply unit or the second power supply unit; and a second switch circuit configured to selectively connect at least a first output terminal of the plurality of output terminals of the second driver to either the first power supply unit or the second power supply unit, the method comprising:

receiving an input for adjusting brightness of the display panel; and controlling the first switch circuit and the second switch circuit in a first driving mode so that the first output terminal of the first driver and the first output terminal of the second driver are simultaneously connected to different ones of the first power supply unit and the second power supply unit and controlling the first switch circuit and the second switch circuit in a second driving mode so that the first output terminal of the first driver and the first output terminal of the second driver are simultaneously connected to only the first power supply unit, wherein the first or second driving mode is set based on the input.

9. The method of claim 8, further comprising:

based on receiving an input for lowering the brightness of the display panel to a specified brightness while the first driving mode is set, controlling the first switch circuit and the second switch circuit to set the second driving mode.

10. The method of claim 9, further comprising:

turning off the second power supply unit when the second driving mode is set.

11. The method of claim 10, further comprising:

based on receiving an input to increase brightness of the display panel to specified brightness while the second driving mode is set, turning on the second power supply unit.

12. The method of claim 11, further comprising:

based on turning on the second power supply unit, controlling the first switch circuit and the second switch circuit so that the first driving mode is set.

13. The method of claim 12, wherein the first driver comprises a second output terminal corresponding to a first type light emitting element and configured to receive power from only the first power supply unit, wherein the first output terminal of the first driver corresponds to a second type light emitting element, and wherein the second driver comprises a second output terminal corresponding to the first type light emitting element and configured to receive power from only the first power supply unit, wherein the first output terminal of the second driver corresponds to the second type light emitting element, and wherein the method further comprises:

based on receiving an input for lowering the brightness of the display panel to a specified brightness based on power supplied from first power supply unit being provided to the first type light emitting element through second output terminal of the first driver and the second output terminal of the second driver and power supplied from the second power supply unit being provided to the second type light emitting element through the first output terminal of the first driver and the first output terminal of the second driver, controlling the first switch circuit and the second switch circuit such that power supplied from the first power supply unit is provided to the second type light emitting element through the first output terminal of the first driver and the first output terminal of the second driver and turning off the second power supply unit.

14. The method of claim 13, further comprising:

based on receiving an input for increasing the brightness of the display panel to a specified brightness based on power supplied from the first power supply unit being provided to the second type light emitting element through the first output terminal of the first driver and the first output terminal of the second driver, and the power provided from the first power supply unit being provided to the second type light emitting element through the first output terminal of the first driver and the first output terminal of the second driver, turning on the second power supply unit, and controlling the first switch circuit and the second switch circuit such that power provided from the second power supply unit is provided to the second type light emitting element through the first output terminal of the first driver and the first output terminal of the second driver.

15. A non-transitory computer-readable medium configured to store computer instructions that, when executed by at least one processor of a display apparatus comprising a first power supply unit comprising a power supply, a second power supply unit comprising a power supply, a display panel, a backlight unit configured to provide light to the display panel using first light emitting elements and second light emitting elements, a first driver comprising a plurality of output terminals and configured to drive the first light emitting elements, a second driver comprising a plurality of output terminals and configured to drive the second light emitting elements, a first switch circuit configured to selectively connect at least a first output terminal of the plurality of output terminals of the first driver to either the first power supply unit or the second power supply unit; and a second switch circuit configured to selectively connect at least a first output terminal of the plurality of output terminals of the second driver to either the first power supply unit or the second power supply unit, cause the display apparatus to perform operations comprising:

receiving an input for adjusting brightness of the display panel; and controlling the first switch circuit and the second switch circuit in a first driving mode so that the first output terminal of the first driver and the first output terminal of the second driver are simultaneously connected to different ones of the first power supply unit and the second power supply unit and controlling the first switch circuit and the second switch circuit in a second driving mode so that the first output terminal of the first driver and the first output terminal of the second driver are simultaneously connected to only the first power supply unit, wherein the first or second driving mode is set based on the input.

16. The non-transitory computer-readable medium of claim 15, wherein the operations further comprise:

based on receiving an input for lowering the brightness of the display panel to a specified brightness while the first driving mode is set, controlling the first switch circuit and the second switch circuit to set the second driving mode.

17. The non-transitory computer-readable medium of claim 16, wherein the operations further comprise:

turning off the second power supply unit when the second driving mode is set.

18. The non-transitory computer-readable medium of claim 17, wherein the operations further comprise:

based on receiving an input to increase brightness of the display panel to specified brightness while the second driving mode is set, turning on the second power supply unit.

19. The non-transitory computer-readable medium of claim 18, wherein the operations further comprise:

based on turning on the second power supply unit, controlling the first switch circuit and the second switch circuit so that the first driving mode is set.

20. The non-transitory computer-readable medium of claim 19, wherein the operations further comprise:

based on receiving an input for lowering the brightness of the display panel to a specified brightness based on power supplied from first power supply unit being provided to a first type light emitting element through a second output terminal of the first driver and a second output terminal of the second driver and power supplied from the second power supply unit being provided to a second type light emitting element through the first output terminal of the first driver and the first output terminal of the second driver, control the first switch circuit and the second switch circuit such that power supplied from the first power supply unit is provided to the second type light emitting element through the first output terminal of the first driver and the first output terminal of the second driver and turning off the second power supply unit.

* * * * *